United States Patent [19]

Matsuda et al.

[11] Patent Number: 5,717,318
[45] Date of Patent: Feb. 10, 1998

[54] STEP-DOWN TYPE DC-DC REGULATOR

[75] Inventors: Kouichi Matsuda; Mitsuo Saeki; Hidetoshi Yano; Hidekiyo Ozawa, all of Kawasaki, Japan

[73] Assignee: Fujitsu Limited, Kawasaki, Japan

[21] Appl. No.: 783,003

[22] Filed: Jan. 14, 1997

[30] Foreign Application Priority Data

Jul. 8, 1996 [JP] Japan ............................. 8-177700

[51] Int. Cl.$^6$ ........................................ H02M 7/515
[52] U.S. Cl. ............................................ 323/273
[58] Field of Search .................. 323/273; 363/35–37, 363/41–65, 71–75, 96, 115, 136, 137

[56] References Cited

U.S. PATENT DOCUMENTS 4,674,024  6/1987  Paice et al. ............................. 363/71

FOREIGN PATENT DOCUMENTS

| S57-009275 | 1/1982 | Japan . |
| S62-092512 | 4/1987 | Japan . |
| H5-137320 | 6/1993 | Japan . |

*Primary Examiner*—Aditya Krishman
*Attorney, Agent, or Firm*—Staas & Halsey

[57] ABSTRACT

FET's lying on a switching circuit are used to execute a switched capacitor action. The FET's connect a first capacitor to a battery to charge the former at an input power voltage, and after charging, disconnect the first capacitor from the battery but simultaneously connect the first capacitor to a second capacitor to transfer accumulated electric charges to the latter. A control circuit including a comparator and a voltage controlled oscillator monitors an output voltage from the second capacitor and performs a switching control so that the output voltage is maintained at a specific level.

8 Claims, 5 Drawing Sheets

STEP-DOWN TYPE DC-DC REGULATOR

BACKGROUND OF THE INVENTION

1. Field of the Invention

The present invention relates generally to a step-down type DC-DC regulator for use in a power circuit for hand-held electronic equipments such as notebook computers, and more particularly to the step-down type DC-DC regulator ensuring a high conversion efficiency with substantially the same circuit scale as that of integrated linear regulators.

2. Description of the Related Art

Hand-held electronic equipments such as notebook computers are conventionally mounted with batteries serving as power sources for the equipments. The voltage of the battery suffers typically from a gradual drop with the progress of discharge due to power supply to the load. The DC-DC regulator is thus provided to maintain the voltage of the battery at a certain level, thereby ensuring a constant voltage available within the interior of the electronic equipments.

When the DC-DC regulator is used for the purpose of stabilizing the power voltage in the electronic equipments, two systems are envisaged of relationship between the voltage of the battery mounted on the electronic equipment as well as the voltage supplied externally from, e.g., an AC adaptor, and the voltage for use in the interior of the body of the electronic equipment. One is a system in which a battery supplies to the equipment a voltage higher than the voltage used in the equipment, which is in turn dropped by a DC-DC regulator down to a voltage level used in the interior of the electronic equipment. The DC-DC regulator of this type is called a step-down type. The other is a system in which the battery supplies to the equipment a voltage lower than the voltage used in the equipment, which is in turn raised by a DC-DC regulator up to a voltage level used in the interior of the electronic equipment. It depends on the power consumption of the equipment, battery service time, equipment dimensions, equipment weight, etc., whether the electronic equipment should employ the step-down type DC-DC regulator or the step-up type DC-DC regulator. In the case of typical hand-held electronic equipments such as notebook computers, use is often made of the step-down type DC-DC regulator due to higher battery voltage than the voltage required by the equipment. Since in this case some different types of voltages are used within the interior of the equipment, there is a need to provide DC-DC regulators corresponding in number to the types of the voltages. Due to the fact that the equipment is operated by the battery, it would be desired for the DC-DC regulator to have as high an efficiency as possible. A switching regulator is known as the high-efficiency DC-DC regulator. Inconveniently, employment of the switching regulator may result in a need for large-scale circuit components such as choke coils, which will lead to an increase in the circuit scale as well as in cost of production. For this reason, little use is made of the switching regulator as the DC-DC regulator for use in the hand-held electronic equipments having an extremely small output current. Instead, a simple linear regulator (a voltage regulator or a three-terminal regulator) is typically used as a small-capacitance step-down type DC-DC regulator. The linear regulator in particular is integrated into a single chip and is low in price. Although the linear regulator is poor in efficiency for a small output voltage, it is capable of having physically small dimensions as well as reducing the proportion in which it occupies in the entire system, thereby fully compensating for the poor efficiency.

No doubt the linear regulator has a poor efficiency though it is used within a small output voltage range. If, for example, it is desired to obtain a 3.0 V output from a 16 V input, the efficiency of the linear regulator results in 20% since it is equal to the voltage ratio, with all the remaining 80% being power loss. For this reason, in the case of using a corresponding number of linear regulators for some types of voltages within the interior of the electronic equipments such as notebook computers, the power loss will be increased in total, and hence the battery voltage based equipment service time will be restricted to a large extent.

SUMMARY OF THE INVENTION

It is therefore the object of the present invention to provide a step-down type DC-DC regulator ensuring a circuit scale equivalent to the linear regulator as well as ensuring a high-efficiency comparable to the switching regulator.

According to the aspect of the present invention, there is provided a step-down type DC-DC regulator for providing as its step-down output a specific voltage lower than an input power voltage derived from a power source, comprising a first capacitor disposed at power input side; a second capacitor disposed at power output side; a switching circuit for repeatedly performing switching connections in which it connects the first capacitor to the power source to charge the former at the input power voltage and, after charging, disconnects the first capacitor from the power source but simultaneously connects the first capacitor to the second capacitor to transfer accumulated electric charges to the second capacitor; and a control circuit for monitoring an output voltage at the second capacitor and providing a control of the switching circuit so that the output voltage is maintained at a specific level.

The step-down type DC-DC regulator of the present invention is a so-called switched capacitor based step-down DC-DC regulator intended to keep the output voltage at a specific level irrespective of a variation in its output current by alternately switching the connections of the input-side first capacitor and of the output-side second capacitor to transfer electric charges from the input side to the output side and by controlling the electric charge transfer switching time. In the switched capacitor based step-down DC-DC regulator of the present invention, the resistor region for dropping the voltage is replaced by the electric charge transfer switching time, with the result that there arises no power loss attributable to resistance and remarkably high efficiency is achieved. There is also no need for large-scale circuit components such as a choke coil required in the switching regulator, thus leading to a simple circuit configuration and accomplishing a miniaturization and reduction in costs through integration equivalent to the linear regulator.

The control circuit of the step-down type DC-DC regulator comprises an oscillation circuit for providing a switching control signal as its output to the switching circuit; and an error detection circuit for detecting an error voltage between an output voltage at the second capacitor and a reference voltage, the error detection circuit, for the duration in which the error voltage is acquired, activating the oscillation circuit to switchingly control the switching circuit, the error detection circuit, when the error voltage results in zero, ceasing the action of the oscillation circuit to bring the switching control of the switching circuit to rest. The oscillation circuit is a voltage controlled oscillator having an oscillation frequency varying in response to an input voltage, in which an input power voltage at the power source side for the first capacitor is applied to the voltage controlled oscillator so as to cause the oscillation frequency to vary in response to the input power voltage, to thereby control a switching rate of the switching circuit. More specifically, the voltage controlled oscillator linearly adds to its oscillation frequency in proportion to a drop in input power voltage, to thereby maintain the output voltage at the second capacitor at a predetermined reference voltage level. Thus, regardless of a gradual drop with elapse of service time in voltage from the battery mounted, the output voltage can be kept at a reference voltage level without being affected by a drop in battery voltage.

A stabilizing circuit is disposed subsequent to the second capacitor for eliminating a variation in the output voltage which may be caused by switching control of the switching circuit. Preferably, the stabilizing circuit can be a linear regulator. In the switched capacitor based step-down DC-DC regulator oft he present invention, the input voltage instantaneously appears at the second capacitor side upon the changeover for the electric charge transfer from the first capacitor to the second capacitor by use of the switching circuit. This variation in voltage is therefore eliminated by way of the linear regulator, achieving a stabilized output voltage. The switching circuit includes a first switch for making or breaking the connection between the first capacitor and the power input side and a second switch for making or breaking the connection between the first capacitor and the second capacitor. In this case, the control circuit repeats alternate switching operations for turning on the first switch but simultaneously off the second switch and then for turning off the first switch but simultaneously on the second switch. The first and second switches are preferably N-channel and P-channel FET's one of which is turned on for common input of control voltage but the other of which is turned off for the same.

The above and other objects, features, and advantages of the present invention will become more apparent from the detailed description that follows with reference to the accompanying drawings.

DETAILED DESCRIPTION OF THE PREFERRED EMBODIMENTS

Figure 1:
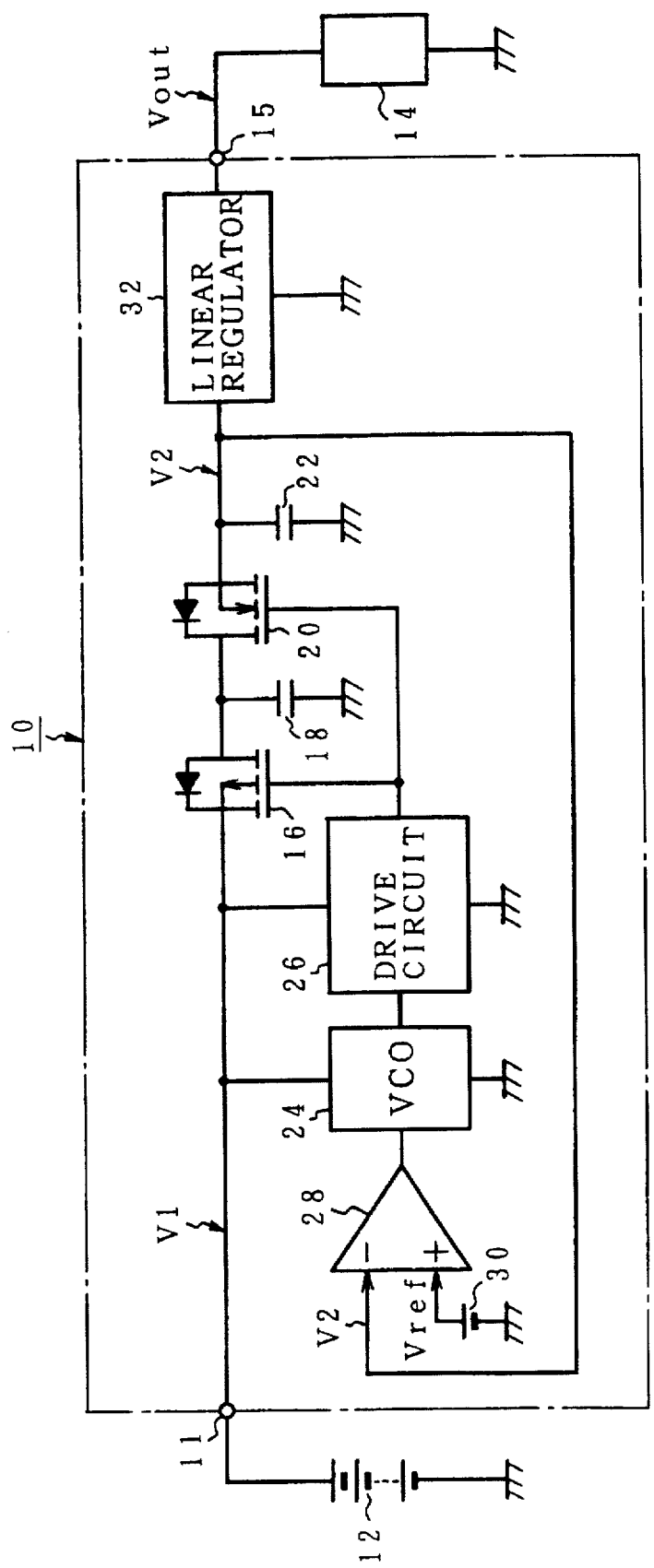
FIG. 1 is a circuit block diagram showing an embodiment of the present invention.

FIG. 1 is a circuit block diagram of a step-down type DC-DC regulator configured in accordance with the present invention. The step-down type DC-DC regulator of the invention generally designated at 10 has a power input terminal 11 connected to, e.g., a battery 12 and a power output terminal 15 connected to a circuit load 14 within a notebook computer. Instead of the battery 12, an AC adaptor may be connected to the power input terminal 11. In the case of the connection to the battery 12 as shown, an input voltage V1 at the power input terminal 11 will result in e.g., 7.5 V. In the case where the AC adaptor is connected to the power input terminal 11, the input voltage V1 will result in e.g., 17.6 V. An output voltage $V_{out}$ at the power output terminal 15 is e.g. 5 V, with an output current of e.g., 10 mA through the circuit load 14. Thus, in this case, power consumption of the load will become 50 mW. The step-down type DC-DC regulator 10 comprises a first capacitor 18 and a second capacitor 22. The first capacitor 18 is connected through a P-channel FET 16 to the power input terminal 11. An N-channel FET 20 is interposed between the first capacitor 18 and the second capacitor 22. The P-channel FET 16 acts as a first switch whereas the N-channel FET 20 acts as a second switch. A drive circuit 26 issues a switching control signal to both the P-channel FET 16 and the N-channel FET 20. In cooperation with the drive circuit 26, a comparator 28 and a voltage controlled oscillator (VCO) 24 constitute a control circuit for the switching control of the FET's 16 and 20. The comparator 28 acts as an error detection circuit. More specifically, an output voltage V2 at the second capacitor 22 is applied to a negative input terminal of the comparator 28 whereas a predetermined reference voltage $V_{ref}$ is applied by a reference voltage source 30 to a positive input terminal of the comparator 28. When the output voltage V2 at the second capacitor 22 falls below the reference voltage $V_{ref}$, the comparator 28 generates a high-level output to activate the voltage controlled oscillator 24. When the output voltage V2 at the second capacitor 22 exceeds the reference voltage $V_{ref}$ on the contrary, the comparator 28 generates a low-level output to cease the action of the voltage controlled oscillator 24. In this embodiment the voltage controlled oscillator 24 serves to vary an oscillation frequency f in accordance with the input voltage V1 supplied from the power input terminal 11.

Figure 2:
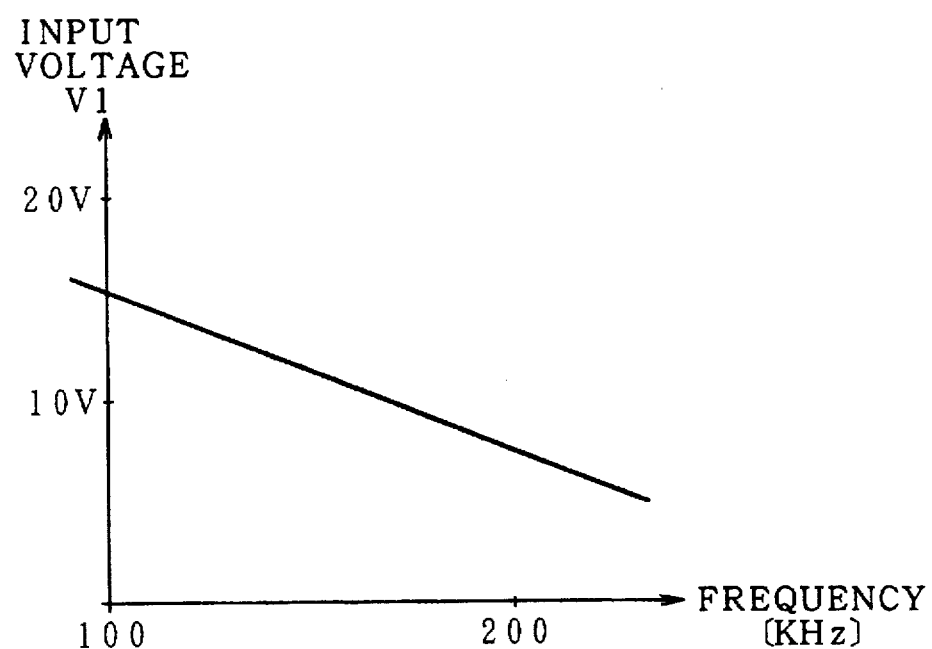
FIG. 2 is a characteristic diagram of input voltage vs. oscillation frequency of a voltage controlled oscillator of FIG. 1.

FIG. 2 is a graphic representation showing an characteristic of the oscillation frequency f of the voltage controlled oscillator 24 versus the input voltage V1, in which in proportion to the reduction of the input voltage V1, the oscillation frequency f is linearly increased in the range of, e.g., about 100 kHz to 200 kHz.

Referring again to FIG. 1, oscillation output of the voltage controlled oscillator 24 is fed to the drive circuit 26 in which it is converted into a switching control signal for the gate control of the FET's 16 and 20. The drive circuit 26 provides as its output switching control signals having low-level and high-level of duty 50% which my depend on the oscillation frequency of the voltage controlled oscillator 24. When the switching control signal from the drive circuit 26 is low-level, the P-channel FET 16 is turned on while simultaneously the N-channel BET 20 becomes off. When the switching control signal from the drive circuit 26 rises up to high-level, the P-channel FET 16 becomes off while simultaneously the N-channel FET 20 is turned on. More specifically, with an oscillation period T depending on the oscillation frequency f of the voltage controlled oscillator 24, the FET 16 turns on, for the duration of 0.5 T, that is, a half of the oscillation period T, allowing the first capacitor 18 to connect to the power input terminal 11 for charging at the input voltage v1. For the duration of remaining 0.5 T, the FET 16 becomes off with the FET 20 on, allowing electric charges accumulated in the first capacitor 18 to be transferred to the second capacitor 22 to charge the same. Repetition is thus made between the first half period of 0.5 T during which the first capacitor 18 is charged at the input voltage V1 and the second half period of remaining 0.5 T during which the electric charges accumulated in the first capacitor 18 are transferred to the second capacitor 22. The second capacitor 22 is followed by a linear regulator 32. The linear regulator 32 is a known circuit also called a three-terminal regulator or a voltage regulator and serves to input the voltage V2 at the second capacitor 22 rather higher than the output voltage $V_{out}$ and fixedly provide as its output $V_{out}$ of, e.g., 5 V by way of a voltage drop due to resistive components. As will be apparent from the later description, the linear regulator 32 eliminates a possibility of variation in the output voltage V2 at the second capacitor 22 which would otherwise be caused by the charge transfer through the switching operations of the FET's 16 and 20.

Figure 3:
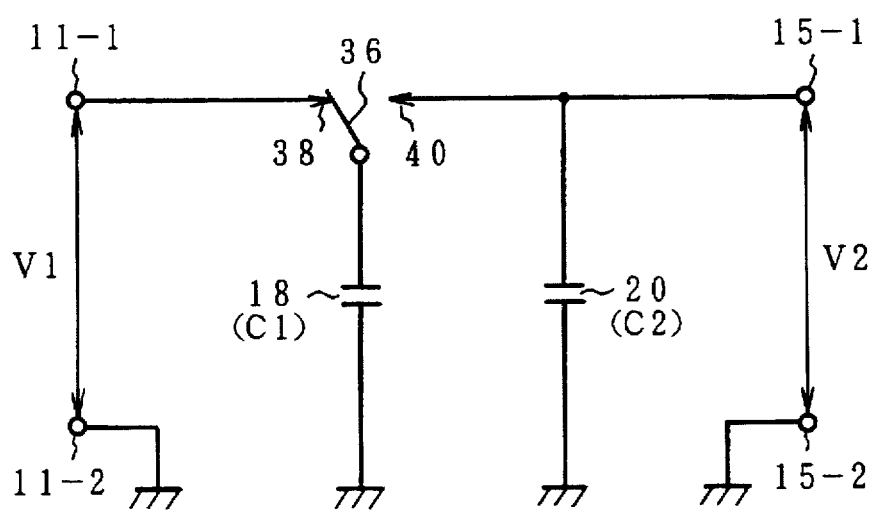
FIG. 3 is a diagram showing an equivalent circuit of the embodiment of FIG. 1.

FIG. 3 is an equivalent circuit diagram showing a principle of operation of the FIG. 1 step-down type DC-DC regulator 10. In FIG. 3 a change-over switch 36 equivalently represents the FET's 16 and 20 which are switchingly controlled by the control circuit consisting of the FIG. 1 comparator 28, the voltage controlled oscillator 24 and the drive circuit 26. When this change-over switch 36 is turned to a change-over terminal 38 and therefore toward a power input terminal 11-1, electric charges Q to be accumulated in the first capacitor 18 at the input voltage V1 are expressed as $$Q = C1 V1 \qquad (1)$$

where capacitance of the first capacitor is C1.

When the change-over switch 36 is turned to a change-over terminal 40 associated with the second capacitor 22, electric charges Q accumulated by the capacitance C1 of the first capacitor 18 is transferred to the second capacitor 22. The total amount Q of the electric charges is unvaried at that time. Let C2 be a capacitance of the second capacitor 22, the following expression is thus obtained.

$$Q = (C1 + C2) V2 \qquad (2)$$

Accordingly, an output voltage V2 between output terminals 15-1 and 15-2 is given as:

$$C1 V1 = (C1 + C2) V2 \qquad (3)$$

$$V2 = \{C1/(C1 + C2)\} V1 \qquad (4)$$

The expression (4) represents that the input voltage V1 can be converted into a desired specific output voltage V2 by making use of a difference in capacitance between the capacitance C1 of the first capacitor 18 connected to the input side and the capacitance C2 of the second capacitor 22 connected to the output side. It would be difficult in an actual circuit to precisely set the ratio of the capacitance C1 of the first capacitor 18 to the capacitance C2 of the second capacitor 22. In the case of the step-down type DC-DC regulator 10 as depicted in FIG. 1, disadvantageously the input voltage V1 is not constantly fixed. In the equivalent circuit of FIG. 3, repeated no-load switching operations of the change-over switch 36 will give rise to a gradual increase in the output voltage V2 through successive charge transfer to the second capacitor 22, eventually allowing the output voltage V2 to reach the level of the input voltage V1. For this reason, as shown in FIG. 1, controlled is a switching operation of the FET's 16 and 20 implementing the function of the change-over switch 36 by means of the control circuit constituted of the comparator 28, the voltage controlled oscillator 24 and the drive circuit 26, whereby the output voltage V2 at the second capacitor 22 is kept at a fixed voltage.

Figure 4:
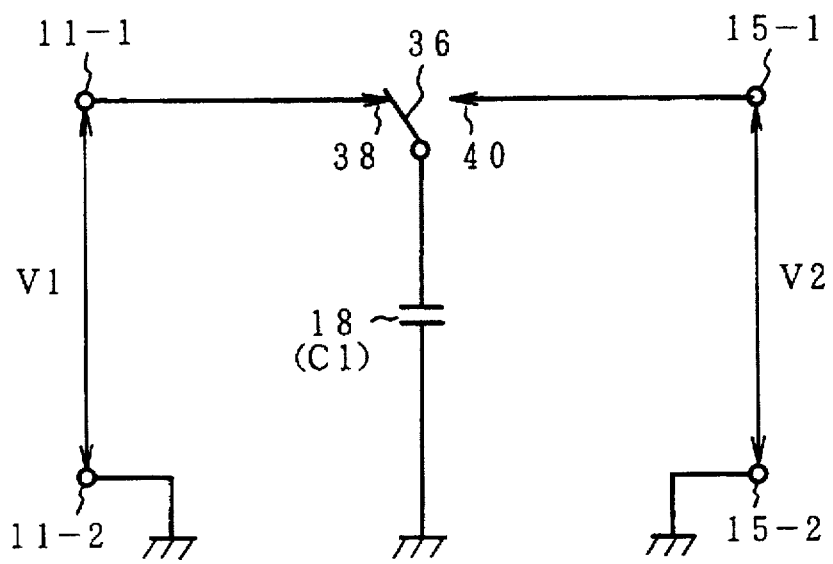
FIG. 4 is a diagram showing an equivalent circuit of a switched capacitor of FIG. 1.

FIG. 4 illustrates an equivalent circuit of a circuit part implementing a switched capacitor of the FIG. 3 equivalent circuit.

If the change-over switch 36 is switchingly controlled with a frequency f, that is, a period T (=1/f), the following expression will represent electric charges Q1 to be accumulated in the first capacitor 18 having a capacitance C1 when the change-over switch 36 is turned to the change-over terminal 38.

$$Q1 = C1 V1 \qquad (5)$$

The below is an expression representing electric charges Q2 to be accumulated in the first capacitor when the change-over switch 36 is turned to the change-over switch 40.

$$Q2 = C1 V2 \qquad (6)$$

The following expression gives electric charges Q to be transferred from the change-over terminal 38 to the change-over terminal 40 during the period T.

$$\begin{aligned} Q &= Q1 - Q2 \\ &= C1 V1 - C1 V2 \\ &= C1(V1 - V2) \end{aligned} \qquad (7)$$

An average current I passing from the change-over terminal 38 to the change-over terminal 40 is given as $$\begin{aligned} I &= Q/T \\ &= C1(V1 - V2)/T \end{aligned} \qquad (8)$$

Figure 5:
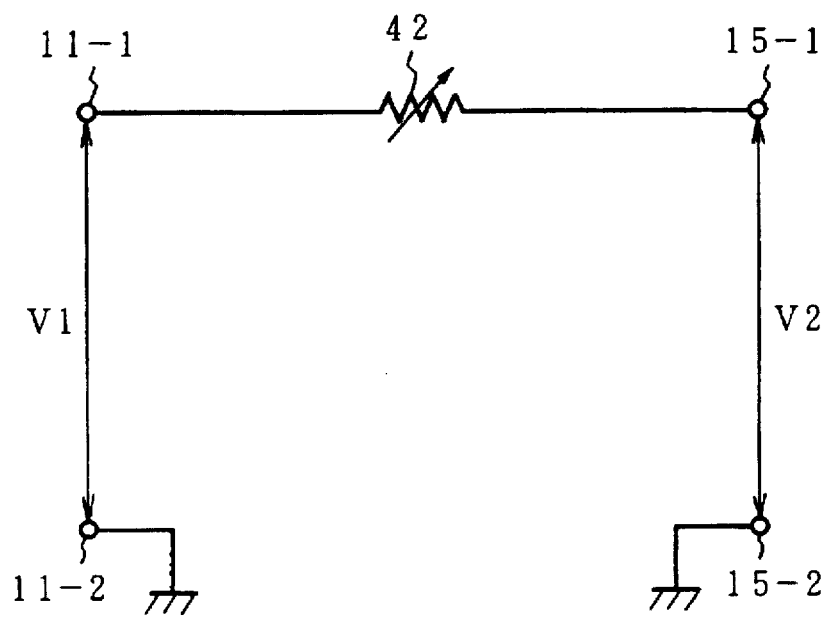
FIG. 5 is a diagram showing an equivalent circuit including a variable resistor in place of a switched capacitor of FIG. 4.

In representation of a resistor equivalent circuit, the expression (8) can be replaced by a variable resistor as shown in FIG. 5. Let R1 be a resistance value of the variable resistor 42, with the input voltage V1 and the average current I, the following expression is obtained.

$$\begin{aligned} R1 &= (V1 - V2)/I \\ &= (V1 - V2)/\{C1(V1 - V2)/T\} \\ &= T/C1 \\ &= 1/C1 \cdot f \end{aligned} \qquad (9)$$

In the FIG. 5 equivalent circuit using a resistor in place of the FIG. 4 switched capacitor, the arrangement is such that the input voltage V1 is divided by the load and a resistance value R1 of the variable resistor 42 connected in series thereto. It will thus be apparent to those skilled in the art to be able to implement the same circuit facility as that of the linear regulator by varying the series resistance value R1 in response to the load current. It is also seen that the resistance value R1 of the variable resistor 42 is controlled by the switching rate (switching cycle) of the change-over switch 36. Thus, if the switching rate (switching cycle) of the change-over switch 38 is controlled in response to the load current, then a voltage regulation control will be achieved in which the output voltage is constantly kept by virtue of the step-down in the input voltage similar to that in the linear regulator.

In the switched capacitor facility of the step-down type DC-DC regulator according to the present invention, the function of the variable resistor 42 in the FIG. 5 linear regulator is replaced by connection switching time controllable by the change-over switch 36 of the first capacitor 18, thus eliminating a possibility of occurrence of power loss attributable to resistance, to thereby accomplish a remarkably effective DC-DC conversion. Such a circuit configuration as shown in FIG. 1 is in effect employed on the basis of a principle of the step-down type DC-DC regulator by use of the switched capacitor of the present invention set forth hereinabove.

FIGS. 6A to 6D are timing charts showing signal waveforms which are generated in respective parts upon the operation of the step-down type DC-DC regulator 10 of FIG. 1.

First of all, the reference voltage source 30 for the comparator 28 is set to present a reference voltage $V_{ref}$ slightly higher than the output voltage $V_{out}$ at the linear regulator 32. Now assume that the input voltage V1 derived from the battery 12 is fixed and that the output voltage V2 at the second capacitor 22 is lower than the reference voltage $V_{ref}$ for the comparator 28.

Figure 6A:
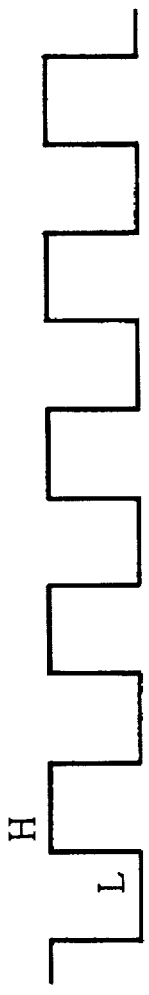
FIGS. 6A to 6D are timing charts for the switching control of FIG. 1.
Figure 6B:
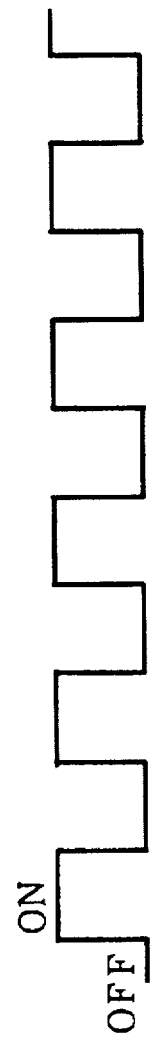
Figure 6C:
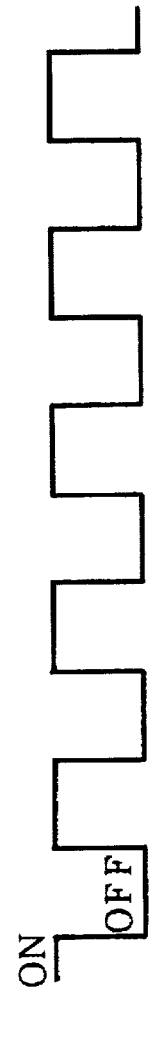

The comparator 28 then generates a high-level output, allowing the voltage controlled oscillator 24 to be activated. In response to the input voltage V1 at that time, the voltage controlled oscillator 24 performs an oscillating action at a predetermined oscillation frequency in accordance with the characteristics of FIG. 2, to provide oscillation pulses as its output to the drive circuit 26. The drive circuit 26 outputs a switching control signal as shown in FIG. 6A in synchronism with the oscillation pulse issued from the voltage controlled oscillator 24. The switching control signal is a pulse string having low-level and high-level of duty 50% with a period T=1/f for the oscillation frequency f of the voltage controlled oscillator 24. FIGS. 6B and 6C illustrate on/off actions to be performed at that time by of the P-channel FET 16 and the N-channel FET 20, respectively. More specifically, when the switching control signal from the drive circuit 26 is on the low-level, the T-channel FET 16 is turned on as shown in FIG. 6B, whereas the N-channel FET 20 becomes off as shown in FIG. 6C, allowing the first capacitor 18 to be charged by way of the FET 16 at the current output voltage V1. Subsequently, when the switching control signal from the drive circuit 26 rises up to the high-level, the P-channel FET 16 conversely turns off but the N-channel FET 20 becomes on, allowing the electric charges accumulated in the first capacitor 18 to be transferred to the second capacitor 22. Thus, the output voltage V2 which has hitherto fallen below the reference voltage $V_{ref}$ is allowed to rise by the transfer of electric charges from the first capacitor 18 to the second capacitor 22 through the switched capacitor action. Once the output voltage V2 exceeds the reference voltage $V_{ref}$, the output of the comparator 28 results in low-level, bringing to rest the oscillating action of the voltage controlled oscillator 24, to thereby turn off the P-channel FET 16 but on the N-channel FET 20. During such an interruption of the switching operation, a load current flows into the circuit load 14, allowing the output voltage V2 at the second capacitor 22 to fall again below the reference voltage $V_{ref}$, whereupon the output of the comparator 28 results in high-level, resuming the oscillating action of the voltage controlled oscillator 24 with the aim of restoring the output voltage V2 through the switched capacitor action.

Figure 6D:
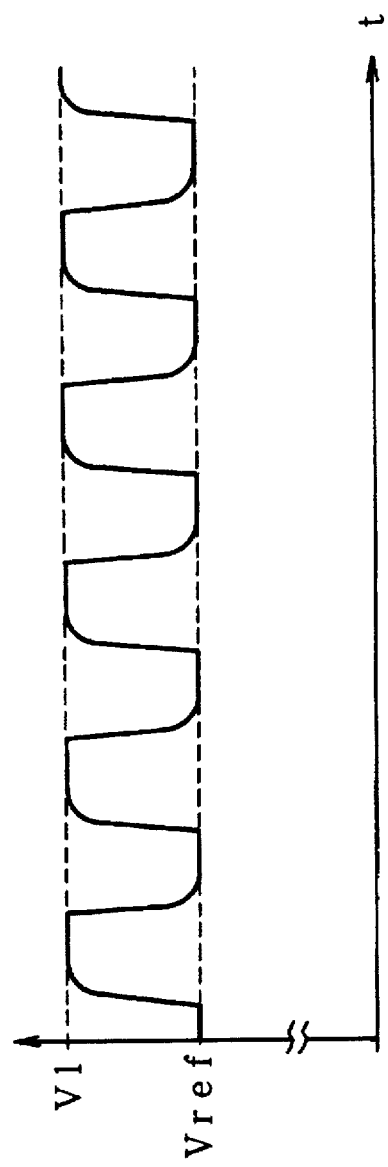

Upon the switched capacitor action by way of the switching control of the FET's 16 and 20 based on the oscillation pulses from the voltage controlled oscillator 24, the first capacitor 18 is subjected to a voltage change in which as shown in FIG. 6D it is charged to the level of the input voltage V1 when the P-channel FET 16 is turned on and thereafter is discharged to the level of the reference voltage $V_{ref}$ at the comparator 28 with the N-channel FET 20 on. Accordingly, the voltage at the instant when the N-channel FET 20 is turned on is substantially equal to the level of the input voltage V1 and thereafter falls down to the level of the reference voltage $V_{ref}$ through discharge from the first capacitor 18 to the second capacitor 22. For this reason, if the output voltage V2 at the second capacitor 22 is provided intactly as its output to the circuit load 14, then the input voltage V1 may appear transiently at the output side. In order to avoid the transient appearance of the input voltage V1 at the output side in such a switched capacitor, the second capacitor 22 is followed by the linear regulator 32, thereby preventing any variation in output voltage which may arise from transient and intact appearance of the input voltage V1 at the output side, to accomplish the stabilization. Other than the linear regulator 32, an appropriate suppression circuit is also available as a stabilization circuit for preventing any transient appearance of the input voltage V1 at the output side in this switched capacitor. However, use of the general-purpose linear regulator 32 would be advantageous in that a miniaturized circuit scale is implemented with a simple circuit configuration.

Use of battery 12 as a power source may often cause a gradual drop in input voltage V1 from the battery 12 with the elapse of service time. To compensate for such a drop in input voltage V1 due to consumption of the battery 12, the voltage controlled oscillator 24 adds to an oscillation frequency f2 in accordance with the FIG. 1 characteristics. In other words, drop in the input voltage V1 will lead to a decrease in the amount of electric charges Q accumulated in the first capacitor 18 having a capacitance C1 as is apparent from the expression (1). As a result of this, the voltage controlled oscillator 24 increases the oscillation frequency f by an amount of decrease in the input voltage V1, thereby adding to the electric charges Q to be transferred per unit time. This means that the resistance value R1 is substantially reduced by adding to the frequency f of the expression (9) in the FIG. 5 equivalent circuit replaced by the variable resistor 42. The output voltage is determined depending on the division by the resistance value R1 and the load resistance, and hence by reducing the resistance value R1, the output voltage to be fed to the circuit load 14 is controlled to be kept at a certain level against a drop in the input voltage V1. This will ensure a succession of a stabilized action for providing an output voltage $V_{out}$ until the voltage V1 from the battery 12 falls down to the reference voltage $V_{ref}$ at the comparator 28.

Figure 7:
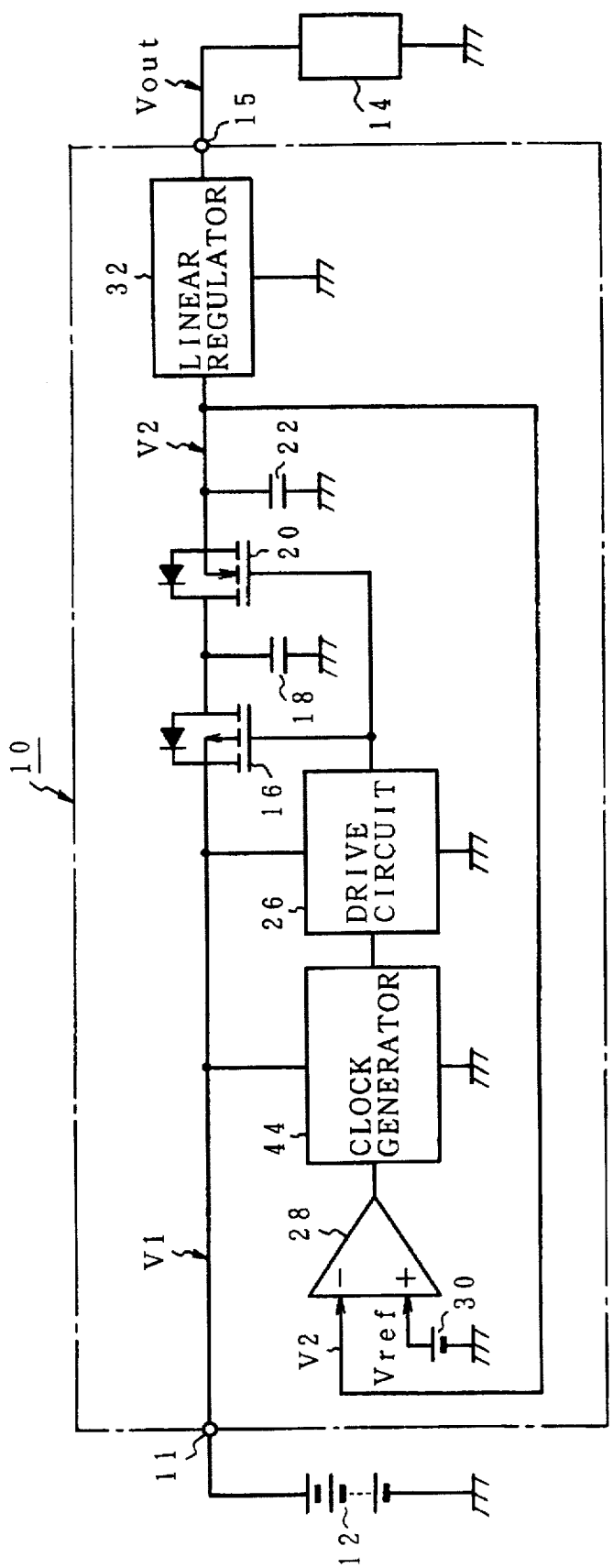
FIG. 7 is a circuit block diagram showing another embodiment of the present invention.

Referring to FIG. 7 there is depicted another embodiment of the step-down type DC-DC regulator according to the present invention. This embodiment is characterized by use of a clock generator 44 having a fixed oscillation frequency instead of the voltage controlled oscillator 24 of FIG. 1. The clock generator 44 serves to perform an oscillating action in response to high-level output generated when the output voltage V1 at the second capacitor 22 falls below the reference voltage $V_{ref}$ from the reference voltage source 30. The clock generator 44 serves further to recover the output voltage V2 which has dropped, with the aid of the electric charge transfer to the second capacitor 22 through the switched capacitor facility of the first capacitor 18 based on the switching control of the FET's 16 and 20 by way of the drive circuit 26. Once the output voltage V2 reaches the reference voltage $V_{ref}$, the output of the comparator 28 results in low-level, bringing the oscillating action of the clock generator 44 to rest. Although the oscillation frequency of the clock generator 44 remains unvaried in spite of a drop in input voltage V1 from the battery 12 since the oscillation frequency is fixed, the duration of the switched capacitor action will be elongated as a function of the drop, due to switching action of the FET's 16 and 20 for causing the output voltage V2 to return to the reference voltage $V_{ref}$. However, if the oscillation frequency of the clock generator 44 is set to an appropriate value of the order of e.g., 100 kHz to 200 kHz, a switched capacitor action will be ensured which is capable of sufficiently compensating for an drop from the reference voltage $V_{ref}$ of the output voltage V2 at the second capacitor 22 attributable to the load current flowing into the load circuit 14, to thereby maintain the output voltage V2 at the reference voltage $V_{ref}$.

The step-down type DC-DC regulator of the present invention shown in FIGS. 1 and 7 will facilitate the integration since its circuit can be implemented by active elements such as FET's, resistance elements and capacitor elements without using any large-scale circuit components such as the choke coil as in the switching regulator. In this case, the circuit scale is slightly increased as compared with the general linear regulators, but implementation will be possible to perform with substantially the same circuit scale and cost as required for the linear regulator IC. In FIGS. 1 and 7, particularly, a commercially available linear regulator IC is used as the linear regulator 32 with the circuit parts other than the linear regulator 32 being integrated to thereby make it possible to provide a low-cost IC chip having a smaller circuit scale.

According to the present invention as discussed above, connections of the first capacitor at the input side and of the second capacitor at the output side are alternately switched so as to allow electric charges to be transferred from the input side to the output side. The electric charge transfer switching time is controlled to constantly maintain the output voltage at a specific voltage against a variance of the output current. The resistor part in the conventional linear regulator which may cause a drop in voltage is replaced by a capacitor electric charge transfer switching time, thus giving rise to no power loss attributable to resistance. Significantly high efficiency is thus achieved. Application of the present invention to the power supply circuit for handheld electronic equipment such as notebook computers would allow the battery service time of the equipment to be elongated with an effective use of the battery. There is no need for large-scale circuit components such as choke coils, dissimilar to the case of the switching regulator, thus resulting in a simple circuit configuration as well as ensuring miniaturization and reduction in production costs by virtue of integration similar to the case of the linear regulator.

It is to be appreciated that the step-down the DC-DC regulator using the switched capacitor according to the present invention is not intended to be limited to numerical values employed in the above embodiments.

What is claimed is:

1. A step-down type DC-DC regulator for providing as its step-down output a specific voltage lower than an input power voltage derived from a power source, comprising:

a first capacitor disposed at power input side;

a second capacitor disposed at power output side;

a switching circuit for repeatedly performing switching connections in which it connects said first capacitor to said power source to charge the former at said input power voltage and, after charging, disconnects said first capacitor from said power source but simultaneously connects said first capacitor to said second capacitor to transfer accumulated electric charges to said second capacitor; and a control circuit for monitoring an output voltage at said second capacitor and providing a control of said switching circuit so that said output voltage is maintained at a specific level.

2. A step-down type DC-DC regulator according to claim 1, wherein said control circuit comprises:

an oscillation circuit for providing a switching control signal as its output to said switching circuit; and an error detection circuit for detecting an error voltage between an output voltage at said second capacitor and a reference voltage, said error detection circuit, for the duration in which said error voltage is acquired, activating said oscillation circuit to switchingly control said switching circuit, said error detection circuit, when the error voltage results in zero, ceasing the action of said oscillation circuit to bring the switching control of said switching circuit to rest.

3. A step-down type DC-DC regulator according to claim 2, wherein said oscillation circuit is a voltage controlled oscillator having an oscillation frequency varying in response to an input voltage, in which an input power voltage at the power source side for said first capacitor is applied to said voltage controlled oscillator so as to cause the oscillation frequency to vary in response to said input power voltage, to thereby control a switching rate of said switching circuit.

4. A step-down type DC-DC regulator according to claim 3, wherein said voltage controlled oscillator adds to its oscillation frequency as a function of the input power voltage, thereby maintaining the output voltage at said second capacitor at a specific level.

5. A step-down type DC-DC regulator according to claim 1, further comprising:

a stabilizing circuit disposed subsequent to said second capacitor for eliminating a variation in the output voltage which maybe caused by switching control of said switching circuit.

6. A step-down type DC-DC regulator according to claim 5, wherein said stabilizing circuit is comprised of a linear regulator.

7. A step-down type DC-DC regulator according to claim 1, wherein said switching circuit includes a first switch for making or breaking the connection between said first capacitor and the power input side and a second switch for making or breaking the connection between said first capacitor and said second capacitor, and wherein said control circuit provides a switching control for turning on said first switch but simultaneously off said second switch and for turning off said first switch but simultaneously on said second switch.

8. A step-down type DC-DC regulator according to claim 1, wherein said first and second switches are comprised of N-channel and P-channel FET's one of which is turned on for common input of control voltage but the other of which is turned off for the same.

\* \* \* \* \*